United States Patent
Hamidouche et al.

(10) Patent No.: US 10,740,163 B2
(45) Date of Patent: Aug. 11, 2020

(54) NETWORK PACKET TEMPLATING FOR GPU-INITIATED COMMUNICATION

(71) Applicant: Advanced Micro Devices, Inc., Santa Clara, CA (US)

(72) Inventors: Khaled Hamidouche, Austin, TX (US); Michael Wayne LeBeane, Austin, TX (US); Walter B. Benton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/022,498

(22) Filed: Jun. 28, 2018

(65) Prior Publication Data

US 2020/0004610 A1 Jan. 2, 2020

(51) Int. Cl.
  *G06F 9/54* (2006.01)
  *G06F 12/02* (2006.01)
(52) U.S. Cl.
  CPC ............ *G06F 9/546* (2013.01); *G06F 12/023* (2013.01); *G06F 2212/1016* (2013.01)
(58) Field of Classification Search
  CPC ....................................................... G06F 9/546
  USPC ....................................................... 719/313
  See application file for complete search history.

(56) References Cited

U.S. PATENT DOCUMENTS

| 9,319,254 | B2* | 4/2016 | Haq | H04L 27/0008 |
| 9,450,780 | B2* | 9/2016 | Wang | H04L 45/38 |
| 2017/0180272 | A1* | 6/2017 | Bernath | H04L 49/3054 |
| 2018/0107627 | A1 | 4/2018 | LeBeane et al. | |

OTHER PUBLICATIONS

Gysi et al., "dCUDA: Hardware Supported Overlap of Computation and Communication", Proceedings of the International Conference for High Performance Computing, Networking, Storage and Analysis, Nov. 13-18, 2016, 12 pages.

Oden et al., "InfiniBand Verbs on GPU: a case study of controlling an InfiniBand network device from the GPU", International Parallel & Distributed Processing Symposium Workshops, May 19-23, 2014, 8 pages.

(Continued)

*Primary Examiner* — Andy Ho
(74) *Attorney, Agent, or Firm* — Kowert Hood Munyon Rankin and Goetzel PC; Rory D. Rankin

(57) ABSTRACT

Systems, apparatuses, and methods for performing network packet templating for graphics processing unit (GPU)-initiated communication are disclosed. A central processing unit (CPU) creates a network packet according to a template and populates a first subset of fields of the network packet with static data. Next, the CPU stores the network packet in a memory. A GPU initiates execution of a kernel and detects a network communication request within the kernel and prior to the kernel completing execution. Responsive to this determination, the GPU populates a second subset of fields of the network packet with runtime data. Then, the GPU generates a notification that the network packet is ready to be processed. A network interface controller (NIC) processes the network packet using data retrieved from the first subset of fields and from the second subset of fields responsive to detecting the notification.

20 Claims, 9 Drawing Sheets

(56) References Cited

OTHER PUBLICATIONS

Orr et al., "Gravel: Fine-Grain GPU-Initiated Network Messages", International Conference for High Performance Computing, Networking, Storage and Analysis, Nov. 2017, 12 pages.
Rossetti, Davide, "GPUDirect: Integrating the GPU With a Network Interface", GPU Technology Conference, 2015, 18 pages, NVIDIA, http://on-demand.gputechconf.com/gtc/2015/presentation/S5412-Davide-Rossetti.pdf. [Retrieved Jun. 16, 2018].
International Search Report and Written Opinion in International Application No. PCT/US2019/029040, dated Sep. 4, 2019, 12 pages.
Kim et al., "GPUnet: Networking Abstractions for GPU Programs", Proceedings of the 11th USENIX conference on Operating Systems Design and Implementation, Oct. 6, 2014, pp. 201-216, vol. 34, Issue 3.

* cited by examiner

| Network Packet Template 505 | Valid Indicator 510 | Packet Ready Indicator 515 | Field 520A | Field 520B | Field 520C | Field 520D | ... | Field 520N |
|---|---|---|---|---|---|---|---|---|

FIG. 5

| Network Packet Template 605 | Valid Indicator 610 | Packet Ready Indicator 615 | Network Control Bits 620 | Memory Access Key 625 | Source Offset 630 | Destination Offset 635 | ... | Operation Type 640 |

FIG. 6

NETWORK PACKET TEMPLATING FOR GPU-INITIATED COMMUNICATION

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

A general-purpose processor, such as a central processing unit (CPU), typically performs input/output (I/O) operations for a software application. In a system that includes multiple processors, the CPU might be the only processor that can generate network messages. The system can also include a data parallel processor in addition to the general-purpose processor. The data parallel processor has a highly parallel execution architecture. Data parallel processors can include graphics processing units (GPUs), digital signal processors (DSPs), and so forth. A data parallel processor incurs delays in computations while waiting for the CPU to coordinate network communication on its behalf. In a computing system with a CPU and a GPU, the CPU is often referred to as "the host". In these systems, the GPU is a second class citizen with regards to network operations. This limits the ability of the GPU to initiate network operations, and requires the CPU to be involved in any network operations launched by the GPU. Using the host to generate network messages for the GPU can potentially involve several back-to-back round trips from the GPU to the host and from the host to the network interface, resulting in a reduction in performance.

BRIEF DESCRIPTION OF THE DRAWINGS

The advantages of the methods and mechanisms described herein may be better understood by referring to the following description in conjunction with the accompanying drawings, in which:

FIG. 5 illustrates a diagram of one implementation of a network packet template.

FIG. 6 illustrates a diagram of another implementation of a network packet template.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing network packet templating are disclosed herein. A first processor (e.g., central processing unit (CPU)) creates a network packet according to a template and populates a first subset of fields of the network packet with static data. Next, the first processor stores the network packet in a memory. A second processor (e.g., graphics processing unit (GPU)) initiates execution of a kernel and detects a network communication request prior to the kernel completing execution. Responsive to detecting the network communication request, the second processor populates a second subset of fields of the network packet with runtime data. Then, the second processor generates a notification that the network packet is ready to be processed. A network interface controller (NIC) processes the network packet using data retrieved from the first subset of fields and from the second subset of fields responsive to detecting the notification.

In one implementation, a circular buffer is maintained in memory which is accessible by the first and second processors. The circular buffer stores a plurality of network packets. In one implementation, the first processor periodically checks the status of the circular buffer, and if the number of existing network packets is below a threshold, then the first processor adds one or more network packets to the circular buffer. When adding network packets to the circular buffer, the first processor populates the first subset of fields of each network packet added to the circular buffer. In one implementation, the first subset of fields include a network control bits field and a memory access key field. In one implementation, the second subset of fields includes a source offset field, a destination offset field, and an operation type field.

Figure 1:
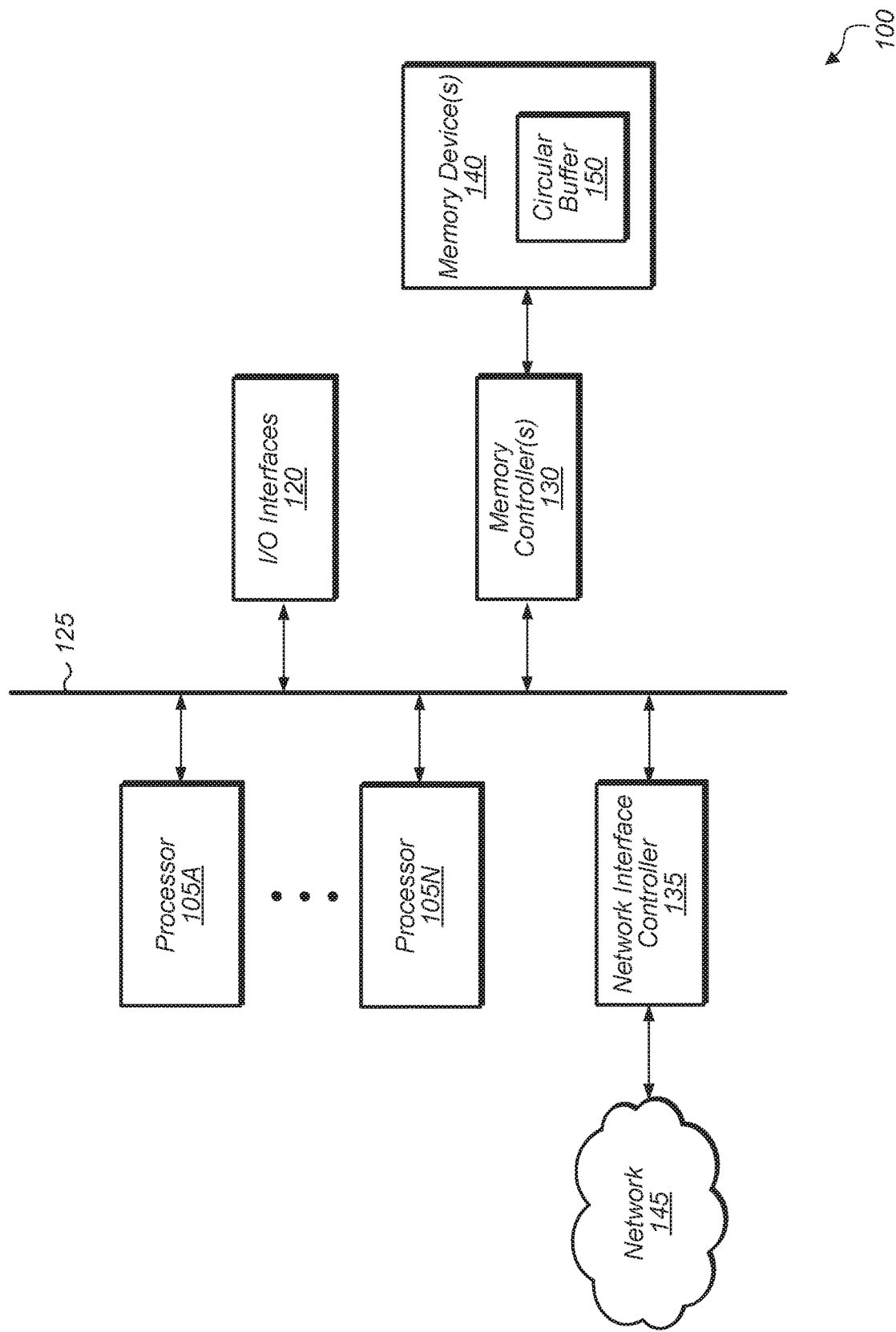
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface controller (NIC) 135, and memory device(s) 140. In other implementations, computing system 100 includes other components and/or computing system 100 is arranged differently. Processors 105A-N are representative of any number of processors which are included in system 100. In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. In one implementation, a given memory device 140 includes a circular buffer 150 for storing newly created network packets generated by a first processor 105A according to a network packet template. The first processor 105A populates each newly created network packet with static information. In one implementation, the given memory device 140 is local to a second processor 105N. When the second processor is ready to initiate a network transmission, the second processor 105N updates a network packet stored in circular buffer 150 with dynamic, runtime information and then the second processor 105N notifies NIC 135 that the network packet is ready to be processed. NIC 135 processes the network packet and performs the requested network communication on network 145. As used herein, a network packet is a formatted data structure with a plurality of fields, wherein the data structure is created by a first processor 105A and updated by a second processor 105B. In other words, a network packet is a formatted data structure which has a first subset of fields that are written to by a first processor 105A and a second subset of fields which are written to and/or updated by a second processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface controller (NIC) 135 receives and sends network messages across network 145. In one implementation, a given processor 105N generates requests for NIC 135 to process a network packet. In one implementation, NIC 135 processes a request generated by processor 105N without involvement of processor 105A. In this implementation, processor 105A is a CPU and processor 105N is a GPU. In other implementations, other types of processors are able to perform these actions.

Network 145 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 145 further includes remote direct memory access (RDMA) hardware and/or software, transmission control protocol/internet protocol (TCP/IP) hardware and/or software, router, repeaters, switches, grids, and/or other components.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
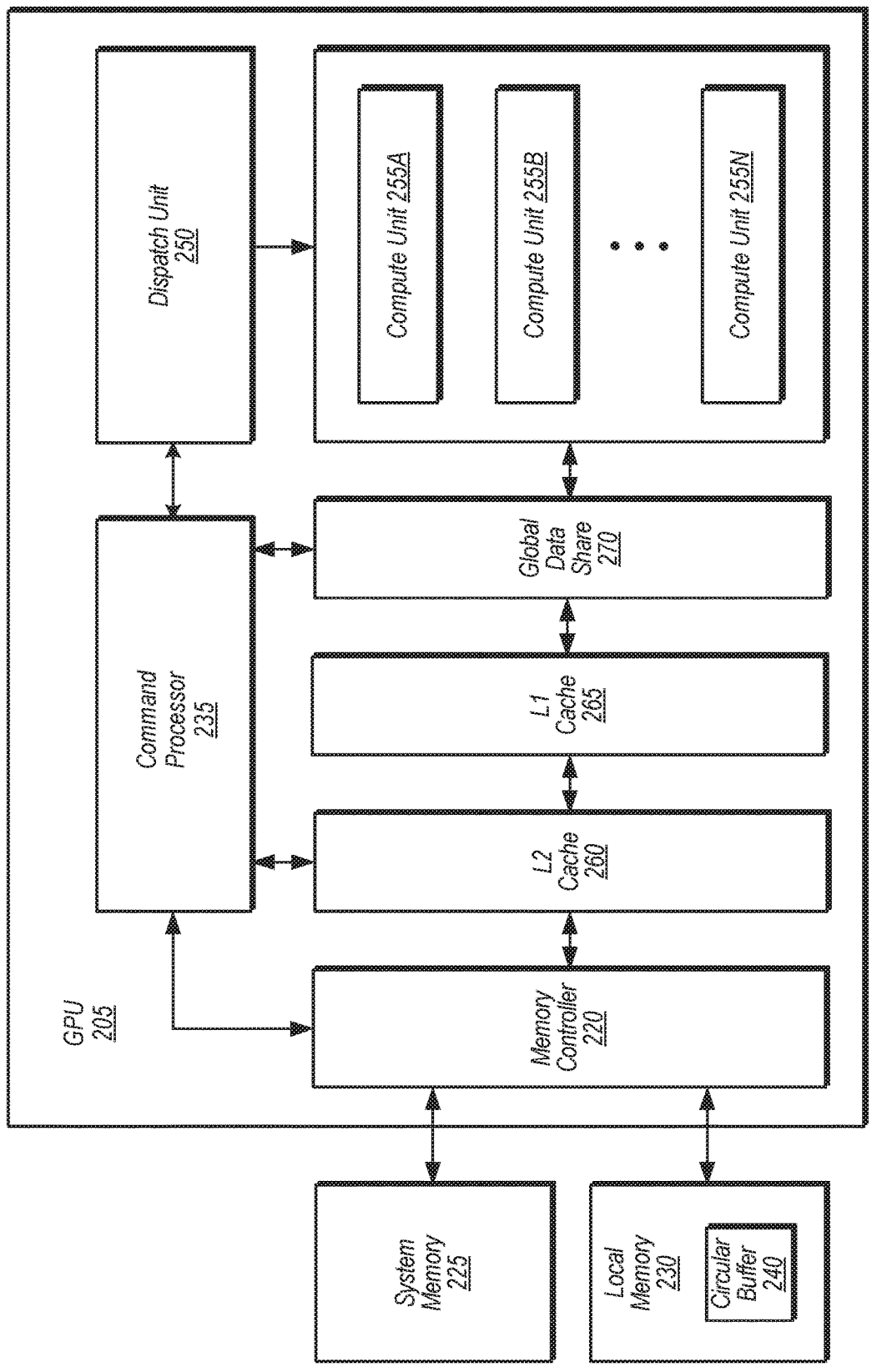
FIG. 2 is a block diagram of another implementation of computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners.

In various implementations, computing system 200 executes any of various types of software applications. In one implementation, as part of executing a given software application, a host CPU (not shown) of computing system 200 launches kernels to be performed on GPU 205. As used herein, the term "kernel" or "compute kernel" is defined as a function or task comprising executable instructions that are launched and executed as one or more threads on one or more compute units. Command processor 235 receives kernels from the host CPU and issues kernels to dispatch unit 250 for dispatch to compute units 255A-N. Threads within kernels executing on compute units 255A-N initiate network communications by updating network packets stored in circular buffer 240 with runtime information and then notifying a NIC (not shown). The NIC processes a given network packet responsive to receiving a corresponding notification. Although not shown in FIG. 2, in one implementation, compute units 255A-N also include one or more caches and/or local memories within each compute unit 255A-N.

Figure 3:
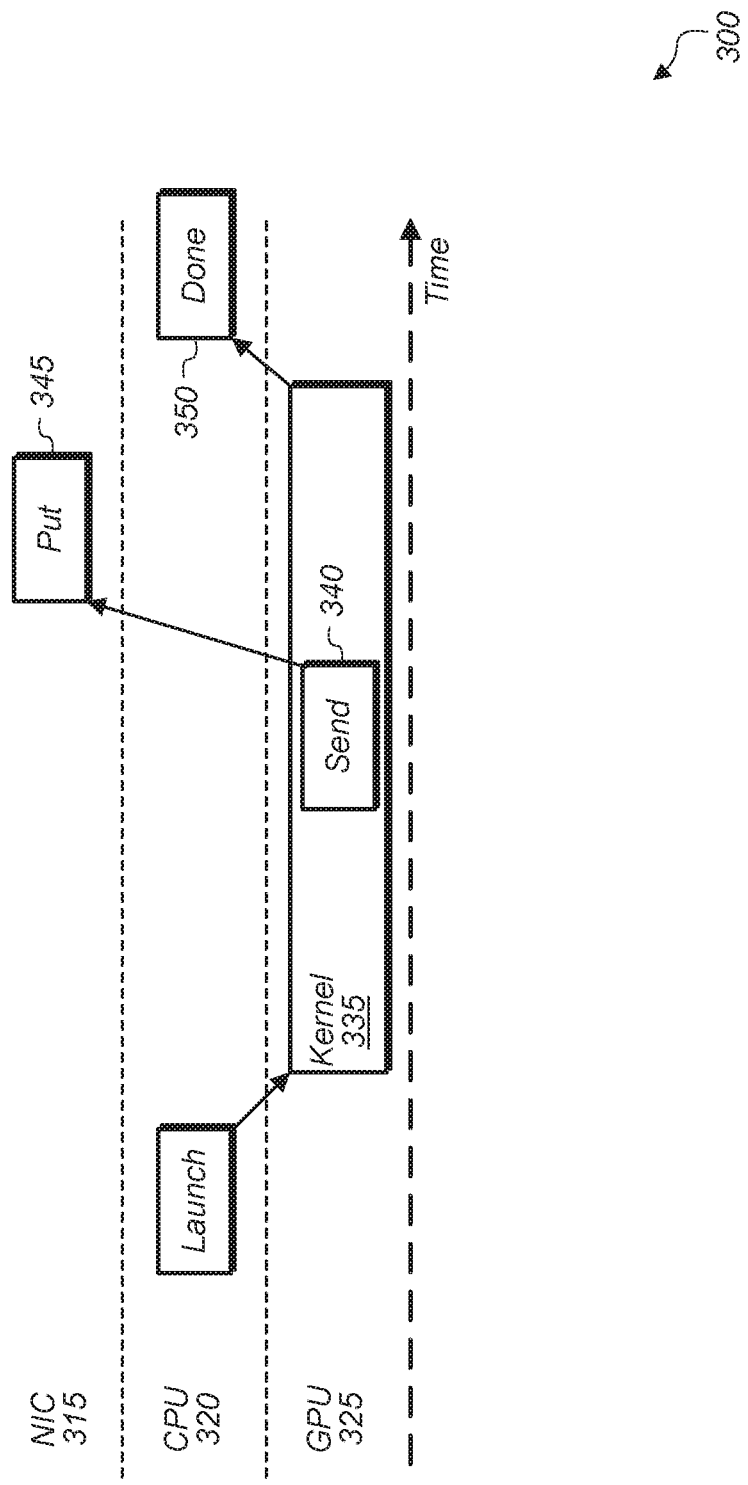
FIG. 3 illustrates a timing diagram of one implementation of a network control path being offloaded from a CPU to a GPU.

Turning now to FIG. 3, a timing diagram 300 of one implementation of a network control path being offloaded from a CPU to a GPU is shown. In one implementation, CPU 320 launches a kernel 335 on GPU 325, and then GPU 325 executes the kernel 335 independently of the CPU 320. While GPU 325 is executing kernel 335, CPU 320 is able to perform other tasks. In some implementations, CPU 320 is coupled to other GPUs, and CPU 320 is able to launch kernels on the other GPUs, with these kernels executing in parallel with kernel 335 on GPU 325. CPU 320 generates network packets according to a template and populates a portion of the fields of each network packet. Then, CPU 320 stores each network packet in a location accessible by GPU 325 and NIC 315. CPU 320 generates network packets ahead of time and without waiting for an explicit request from GPU 325.

During execution of the kernel 335 and without waiting for kernel 335 to complete, GPU 325 populates the remaining portion of fields of a given network packet, and then GPU 325 sends a network packet request to network interface controller (NIC) 315 as illustrated with send block 340. It is noted that GPU 325 sends this network request to NIC 315 without any involvement by CPU 320. NIC 315 processes the network packet request and puts the request on the network while kernel 335 continues to execute as illustrated with put block 345. Although not shown in FIG. 3, it is noted that kernel 335 is able to send multiple network packet requests to NIC 315 which are processed by NIC 315 during execution of kernel 335. At a later point in time, the execution of kernel 335 completes, which is represented by done block 350.

Figure 4:
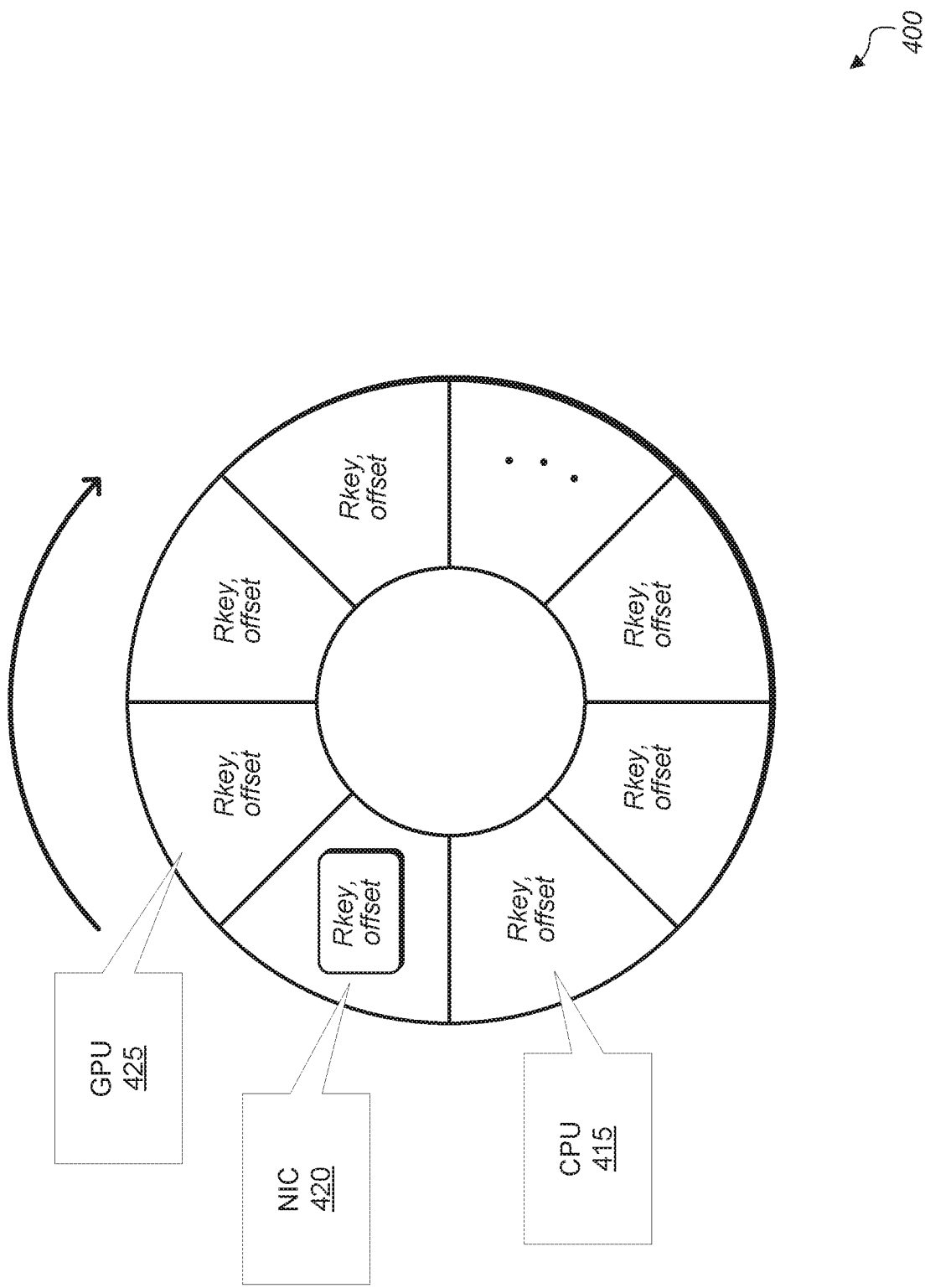
FIG. 4 illustrates a diagram of one implementation of a queue for storing network packet templates.

Turning now to FIG. 4, a diagram of one implementation of a queue 400 for storing network packets is shown. In one implementation, queue 400 is a circular queue in which operations are performed based on a first in, first out (FIFO) principle and with the last position connected back to the first position to make a circle. It is noted that a "circular queue" is also referred to as a "circular buffer" herein. In other implementations, queue 400 is implemented using any of various other types of data structures. In one implementation, queue 400 is used by a computing system which includes a CPU, GPU, and NIC.

In one implementation, CPU 415 adds network packets to queue 400, wherein each network packet is generated according to a network packet template. As used herein, a "network packet template" is defined as a structure of a communication packet, created by a first processor, but with one or more empty fields to be filled in and/or updated by a second processor. In other words, the "network packet template" defines the structure of a communication packet but at least a portion of the contents of the communication packet will be filled in by the second processor. Typically, CPU 415 will fill in a portion of the fields of a network packet with static information (e.g., network control bits, memory access key (Rkey)) before storing the packet at an available slot in queue 400. After the second processor writes the second subset of fields to the network packet, a notification is conveyed to NIC 420 to process the network packet. In other words, the network packet becomes ready once the second processor completes filling out all of the fields and generates a notification for NIC 420. In one implementation, the second processor notifies NIC 420 that the network packet is ready by writing a notification to a doorbell register. In other implementations, the second processor uses other techniques for conveying a notification to NIC 420.

In one implementation, CPU 415 adds newly created network packets to queue 400 on a periodic basis. For example, CPU 415 periodically checks the status of queue 400. In one implementation, each queue entry includes a valid indicator to indicate if the queue entry stores a valid network packet. It is noted that a "queue entry" is also referred to as a "queue slot" herein. In one implementation, if there are any unused (i.e., available) slots in queue 400 as indicated by the valid indicators, then CPU 415 adds one or more network packets to these empty entries of queue 400. In another implementation, if the number of network packets currently stored in queue 400 is less than a threshold, then CPU 415 adds one or more network packets to the available slots of queue 400. In various implementations, the number of 415 network packets which CPU 415 adds to queue 400 is fixed, programmable, based on the number of available slots, or determined in other suitable manners.

In one implementation, NIC 420 maintains a pointer which points to the next location in queue 400 to be processed. After NIC 420 receives a notification and processes a network packet, NIC 420 increments the pointer to point to the next location in the queue. Similarly, GPU 425 maintains a pointer which points to a location in queue 400 which stores a network packet which is ready to be modified and then processed by NIC 420. In one implementation, the pointer maintained by GPU 425 is offset by one queue element from the pointer maintained by NIC 420. Similarly, in one implementation, CPU 415 maintains a pointer which points to an available location in queue 400 for storing a newly created network packet.

In one implementation, CPU 415 queries the entries of queue 400 to determine if there are any entries available for storing a newly created network packets. In one implementation, if CPU 415 detects an available entry in queue 400, CPU 415 generates a new network packet and stores the network packet in the available entry. In another implementation, if CPU 415 detects an available entry in queue 400 and a first condition is met, CPU 415 generates a new network packet and stores the network packet in the available entry. In one implementation, the first condition is queue 400 having less than a threshold number of network packets that are ready to be used by GPU 425. In other implementations, the first condition is any of various other types of conditions. In various implementations, CPU 415 creates network packets ahead of time and out of the critical path. In this way, when GPU 425 needs to generate a network packet, GPU 425 accesses a network packet stored on queue 400 in real-time and sets up the network packet for immediate consumption by NIC 420 without any involvement of CPU 415.

Referring now to FIG. 5, a diagram of one implementation of a network packet template 505 is shown. In various implementations, a network packet template as described herein includes a plurality of indicators and/or fields with various static and runtime information. For example, in one implementation, network packet template 505 includes a valid indicator 510, a packet ready indicator 515, and a plurality of fields 520A-N. In other implementations, network packet template 505 includes other numbers and/or types of indicators and fields and/or network packet template 505 is structured in other suitable manners.

In one implementation, valid indicator 510 indicates if the entry stores a valid network packet. A valid network packet is a packet which has been created and initialized by a first processor (e.g., CPU) and is ready to be updated by a second processor (e.g., GPU, processing in memory (PIM) device). In one implementation, packet ready indicator 515 specifies when the entry stores a network packet which is ready to be processed by a NIC. In various implementations, fields 520A-N store any of various network communication settings. In one implementation, a first subset of fields 520A-N are programmed by the first processor when a network packet is created according to network packet template 505, and a second subset of fields 520A-N are programmed in real-time when the second processor needs to initiate a network transmission.

Turning now to FIG. 6, a diagram of another implementation of a network packet template 605 is shown. In one implementation, network packet template 605 includes a valid indicator 610 and a packet ready indicator 615. Network packet template 605 also includes network control bits 620 and memory access key 625. In one implementation, a first processor (e.g., CPU) fills in the fields for network control bits 620 and memory access key 625 when creating a network packet according to template 605 and storing the network packet on a queue (e.g., queue 400 of FIG. 4) in a memory accessible by a second processor (e.g., GPU). Although not shown, in other implementations, network packet template 605 also includes one or more other fields which are filled in by the first processor upon the creation and storing of a network packet in the queue.

Network packet template 605 also includes various fields which are filled in dynamically by the second processor with runtime information. For example, in one implementation, network packet template 605 includes source offset 630, destination offset 635, and operation type 640 which are filled in with runtime information by the second processor. Source offset 630 specifies where in a source buffer or source memory device to begin the transfer of data. Destination offset 635 specifies where in a destination buffer or destination memory device to store the transferred data. Operation type 640 specifies the type of operation (e.g., read, write, atomic) that is to be performed. It is noted that in other implementations, network packet template 605 includes other numbers and types of fields that are filled in dynamically with runtime information by the second processor. Also, in further implementations, network packet template 605 is structured in other suitable manners.

Figure 7:
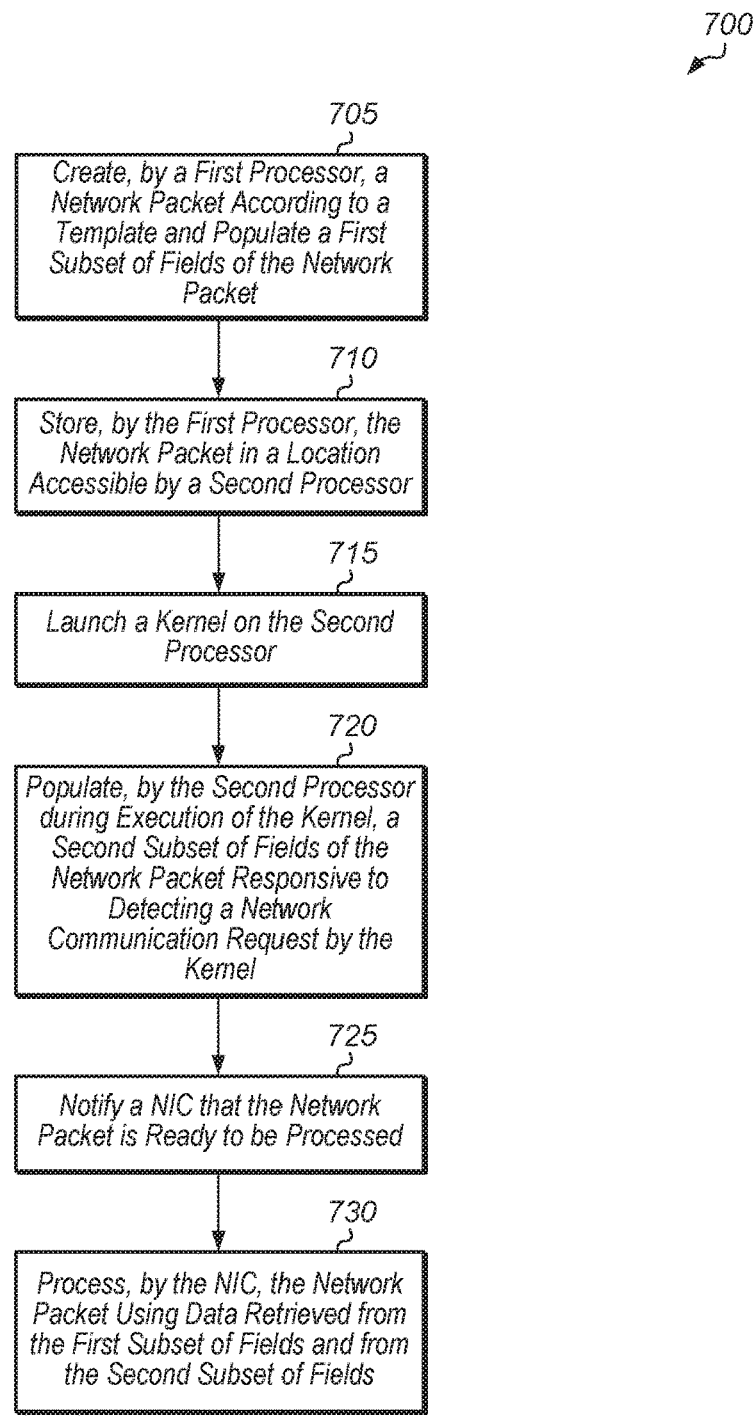
FIG. 7 is a generalized flow diagram illustrating one implementation of a method for creating and using network packet templates.
Figure 8:
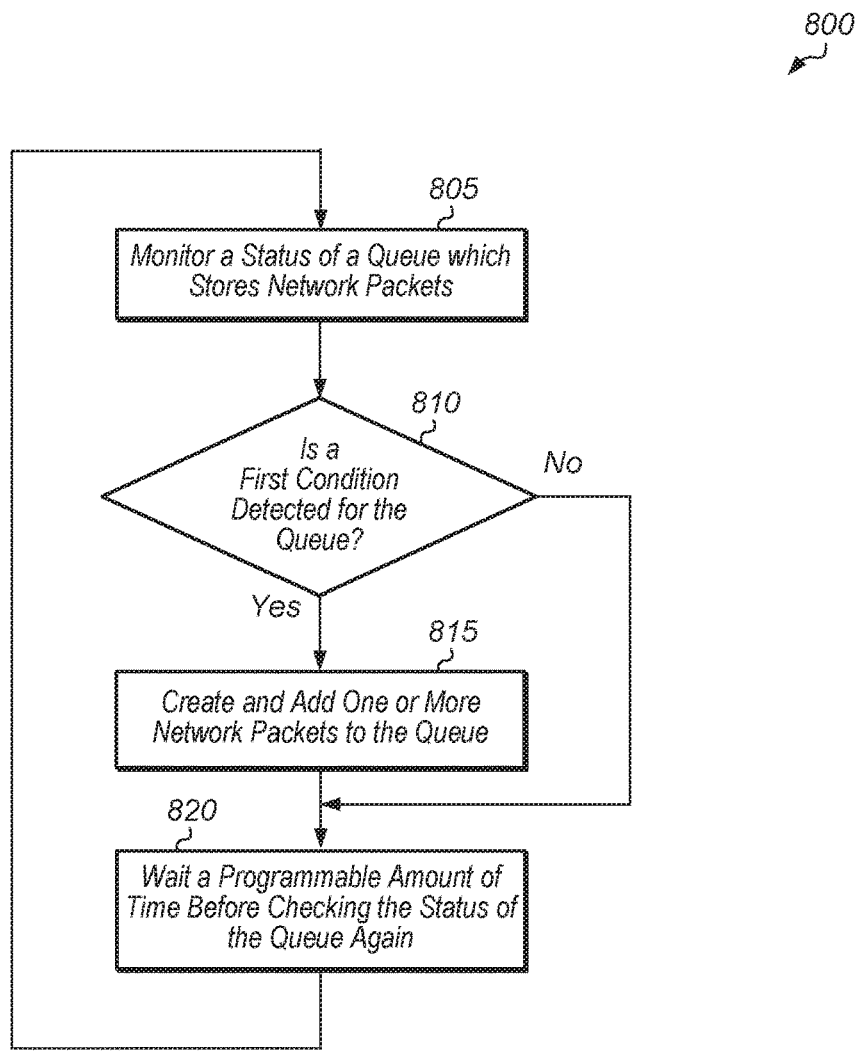
FIG. 8 is a generalized flow diagram illustrating one implementation of a method for determining when to add network packet templates to a queue.

Referring now to FIG. 7, one implementation of a method 700 for creating and using network packet templates is shown. For purposes of discussion, the steps in this implementation and those of FIG. 8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A first processor creates a network packet according to a template and populates a first subset of fields of the network packet (block 705). In one implementation, the first processor is a CPU. The first processor stores the network packet in a location accessible by a second processor (block 710). In one implementation, the first processor performs steps 705 and 710 without receiving an explicit request for a network packet template from the second processor. This allows steps 705 and 710 to be performed ahead of time and out of the critical path. In one implementation, a ready flag is not set for the network packet stored by the first processor to indicate that the network packet is not yet ready to be processed by a NIC. The ready flag not being set also indicates that a second processor still needs to add more data to the network packet before the network packet becomes ready.

Also, the first processor launches a kernel on a second processor (block 715). In one implementation, the second processor is a GPU. It is noted that step 715 is sometimes performed in parallel with steps 705 and 710 or prior to steps 705 and 710. Next, during execution of the kernel, the second processor populates a second subset of fields of the network packet responsive to detecting a network communication request by the kernel (block 720). Then, the second processor notifies a NIC that the network packet is ready to be processed (block 725). Next, the NIC processes the network packet using data retrieved from the first subset of fields and from the second subset of fields (block 730). After block 730, method 700 ends.

Turning now to FIG. 8, one implementation of a method 800 for determining when to add network packet templates to a queue is shown. A first processor monitors a status of a queue which stores network packets (block 805). If a first condition is detected for the queue (conditional block 810, "yes" leg), then the first processor creates and adds one or more network packets to the queue (block 815). In one implementation, the first condition is the occupancy level of the queue being below a threshold, wherein the occupancy level is specified as a number of valid network packets which are stored in the queue and ready to be populated by the second processor. In one implementation, the threshold is programmed by a second processor which updates network packets which are stored in the queue. In this implementation, the second processor adjusts the threshold based on a status of the kernel currently being executed by the second processor. For example, in one implementation, if the second processor executes a kernel which is generating a relatively large number of network requests, then the second processor dynamically reduces the threshold value to ensure that the first processor keeps plenty of network packets on the queue. In other implementations, the second processor adjusts the threshold based on one or more other factors.

In another implementation, the first condition is the queue having one or more available slots for storing network packets. In other implementations, the first condition is any of various other types of conditions. If the first condition is not detected for the queue (conditional block 810, "no" leg), then the first processor waits a programmable amount of time before checking the status of the queue again (block 820). In one implementation, the programmable amount of time is determined by the second processor based on one or more factors associated with the kernel currently being executed. After block 820, method 800 returns to block 805.

Figure 9:
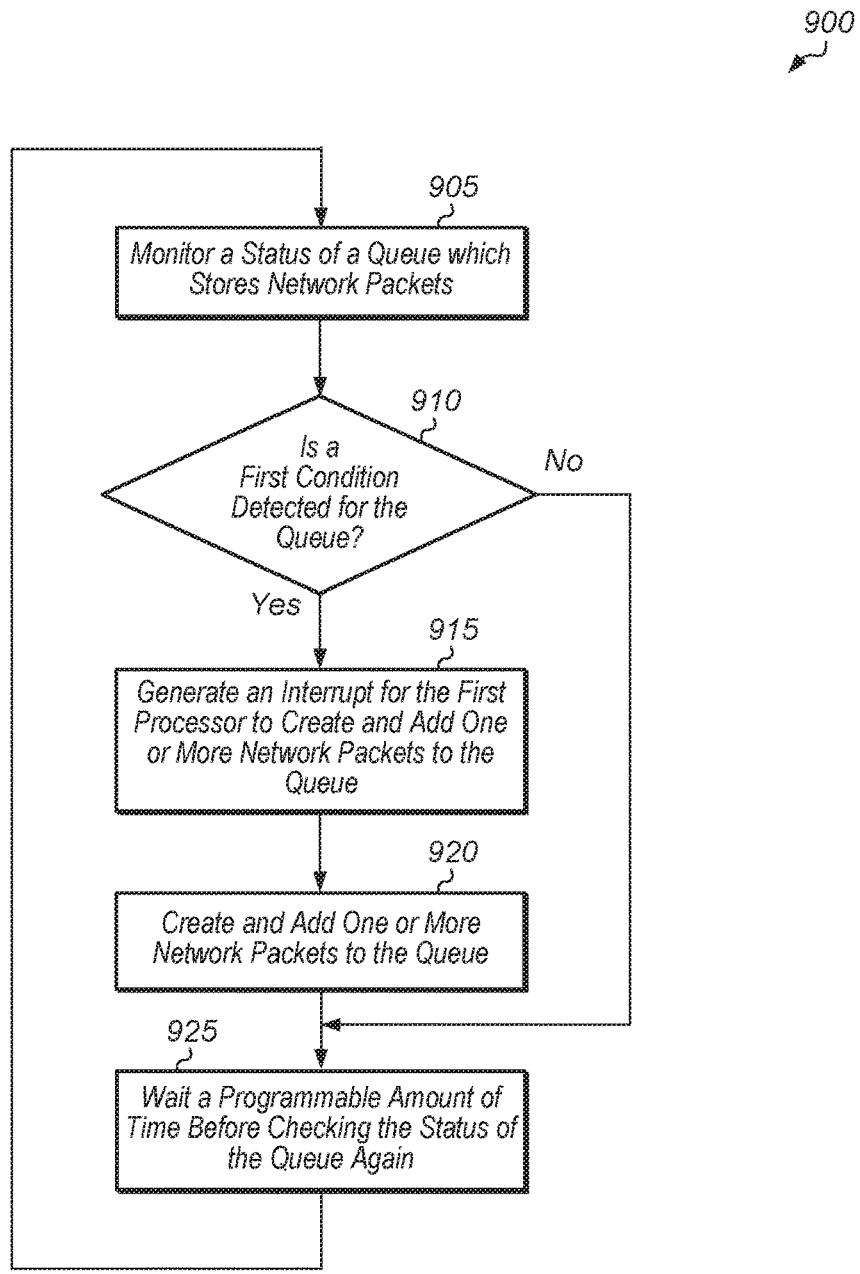
FIG. 9 is a generalized flow diagram illustrating another implementation of a method for determining when to add network packet templates to a queue.

Referring now to FIG. 9, another implementation of a method 900 for determining when to add network packet templates to a queue is shown. In a system with a first processor (e.g., CPU) and a second processor (e.g., GPU), the second processor monitors a status of a queue which stores network packets (block 905). If a first condition is detected for the queue (conditional block 910, "yes" leg), then the second processor generates an interrupt for the first processor to create and add one or more network packets to the queue (block 915). In response to receiving the interrupt, the first processor creates and adds one or more network packets to the queue (block 920).

In one implementation, the first condition is the occupancy level of the queue being below a threshold, wherein the occupancy level is specified as a number of valid network packets which are stored in the queue and ready to have one or more fields populated by the second processor. In another implementation, the first condition is the queue having one or more available slots for storing network packets. In other implementations, the first condition is any of various other types of conditions. If the first condition is not detected for the queue (conditional block 910, "no" leg), then the second processor waits a programmable amount of time before checking the status of the queue again (block 925). After block 925, method 900 returns to block 905.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory;
a first processor configured to:
   create a network packet according to a template and populate a first subset of fields of the network packet; and
   store the network packet in the memory;
a second processor configured to:
   initiate execution of a kernel;
   responsive to detecting a network communication request within the kernel and prior to the kernel completing execution:
      populate a second subset of fields of the network packet; and
      generate a notification that the network packet is ready to be processed;
a network interface controller configured to process, prior to the kernel completing execution, the network packet responsive to detecting the notification.

2. The system as recited in claim 1, wherein the network interface controller processes the network packet using data retrieved from the first subset of fields and from the second subset of fields.

3. The system as recited in claim 1, wherein the first subset of fields include static data, and wherein the second subset of fields include runtime data.

4. The system as recited in claim 1, wherein the first subset of fields includes a network control bits field and a memory access key field, and wherein the second subset of fields includes a source offset field, a destination offset field, and an operation type field.

5. The system as recited in claim 1, wherein the first processor is configured to create the network packet and populate the first subset of fields of the network packet template prior to the second processor detecting the network communication request.

6. The system as recited in claim 1, wherein the first processor is configured to store the network packet in a queue only in response to detecting a first condition.

7. The system as recited in claim 6, wherein the first condition is an occupancy level of the queue being below a threshold.

8. A method comprising:
creating, by a first processor, a network packet according to a template and populate a first subset of fields of the network packet;
storing, by the first processor, the network packet in a memory;
initiating execution of a kernel on a second processor;
responsive to detecting a network communication request within the kernel and prior to the kernel completing execution:
   populating, by the second processor, a second subset of fields of the network packet;
   generating, by the second processor, a notification that the network packet template is ready to be processed; and
processing, by a network interface controller, the network packet template responsive to detecting the notification and prior to the kernel completing execution on the second processor.

9. The method as recited in claim 8, further comprising processing the network packet using data retrieved from the first subset of fields and from the second subset of fields.

10. The method as recited in claim 8, wherein the first subset of fields include static data, and wherein the second subset of fields include runtime data.

11. The method as recited in claim 8, wherein the first subset of fields includes a network control bits field and a memory access key field, and wherein the second subset of fields includes a source offset field, a destination offset field, and an operation type field.

12. The method as recited in claim 8, further comprising creating, by the first processor, the network packet and populating the first subset of fields of the network packet prior to the second processor detecting the network communication request.

13. The method as recited in claim 8, further comprising storing the network packet in a queue only in response to detecting a first condition.

14. The method as recited in claim 13, wherein the first condition is an occupancy level of the queue being below a threshold.

15. A processor comprising:
a memory; and
a plurality of compute units;
wherein the processor is configured to:
   initiate execution of a kernel on one or more compute units of the plurality of compute units;
   responsive to detecting a network communication request within the kernel and prior to the kernel completing execution:
      locate, within the memory, a network packet with only a first subset of fields populated;
      populate a second subset of fields of the network packet; and
      generate a notification that the network packet is ready to be processed.

16. The processor as recited in claim 15, wherein the first subset of fields include static data, and wherein the second subset of fields include runtime data.

17. The processor as recited in claim 15, wherein the first subset of fields includes a network control bits field and a memory access key field, and wherein the second subset of fields includes a source offset field, a destination offset field, and an operation type field.

18. The processor as recited in claim 15, wherein first subset of fields of the network packet are populated prior to the processor detecting the network communication request.

19. The processor as recited in claim 15, wherein the processor is further configured to program a threshold for determining when network packets with the first subset of fields populated are added to a queue.

20. The processor as recited in claim 15, wherein the processor is further configured to convey the notification to a network interface controller to cause the network packet to be processed.

* * * * *